(12) United States Patent
Dhong et al.

(10) Patent No.: US 7,137,021 B2
(45) Date of Patent: Nov. 14, 2006

(54) POWER SAVING IN FPU WITH GATED POWER BASED ON OPCODES AND DATA

(75) Inventors: Sang Hoo Dhong, Austin, TX (US); Silvia Melitta Mueller, St. Ingbert (DE); Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 10/439,037

(22) Filed: May 15, 2003

(65) Prior Publication Data
US 2004/0230849 A1 Nov. 18, 2004

(51) Int. Cl.
*G06F 1/26* (2006.01)
(52) U.S. Cl. .................. 713/324; 713/322; 713/330
(58) Field of Classification Search ............ 713/320, 713/322, 324
See application file for complete search history.

(56) References Cited

U.S. PATENT DOCUMENTS

| | | | |
|---|---|---|---|
| 4,750,112 A * | 6/1988 | Jones et al. ............ 712/217 |
| 5,493,684 A | 2/1996 | Gephardt et al. | |
| 5,666,537 A | 9/1997 | Debnath et al. | |
| 5,726,921 A | 3/1998 | Krick | |
| 6,035,315 A | 3/2000 | Krick | |
| 6,611,920 B1 * | 8/2003 | Fletcher et al. ............ 713/322 |
| 6,665,802 B1 * | 12/2003 | Ober ........................ 713/320 |
| 6,789,207 B1 * | 9/2004 | Maejima ..................... 713/322 |
| 6,826,704 B1 * | 11/2004 | Pickett ....................... 713/320 |
| 6,910,141 B1 * | 6/2005 | Maher et al. ............... 713/323 |

* cited by examiner

*Primary Examiner*—Thuan Du
(74) *Attorney, Agent, or Firm*—Carr LLP; Diana R. Gerhardt

(57) ABSTRACT

A method and an apparatus are provided for saving power in a microprocessor. The microprocessor has at least one functional unit, which has a plurality of blocks. The blocks each include a plurality of sub-blocks. It is determined whether there is any instruction for the functional unit. Upon a determination that there is no instruction for the functional unit, the functional unit is shut down. Upon a determination that there is at least one instruction for the functional unit, at least one inactive block of the functional unit is shut down based on the instruction.

12 Claims, 10 Drawing Sheets

POWER SAVING IN FPU WITH GATED POWER BASED ON OPCODES AND DATA

BACKGROUND OF THE INVENTION

1. Field of the Invention

The invention relates generally to microprocessors and, more particularly, to power management of functional units of microprocessors.

2. Description of the Related Art

Power consumption of microprocessors is becoming an important concern for designers. First, the market for battery-powered systems (e.g., mobile systems) is expanding at a rapid rate, in which systems battery life is important and power is at a premium. Second, having complex designs and large on-chip caches, modern microprocessor chips can ill afford to overheat. Therefore, power consumption is a primary design factor that determines the commercial success of most modern microprocessor products.

Generally, microprocessors have one or more functional units, which execute instructions. These functional units in general and floating-point units (FPUs) in particular are the main culprits in power consumption of microprocessors.

Therefore, a need exists for reducing power consumption in the functional units of microprocessors without affecting the performance. Additionally, there is a need for reducing cooling demand. Further, there is a need for reducing device junction temperature for improved reliability.

SUMMARY OF THE INVENTION

The present invention provides a method and an apparatus for saving power in a microprocessor. The microprocessor has at least one functional unit, which has a plurality of blocks. The blocks each include a plurality of sub-blocks. It is determined whether there is any instruction for the functional unit. Upon a determination that there is no instruction for the functional unit, the functional unit is shut down. Upon a determination that there is at least one instruction for the functional unit, at least one inactive block of the functional unit is shut down based on the instruction.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code that, for example, resides on a computer readable medium or is stored on a computer readable medium, software, and/or integrated circuits that are coded to perform such functions, unless indicated otherwise.

Figure 1:
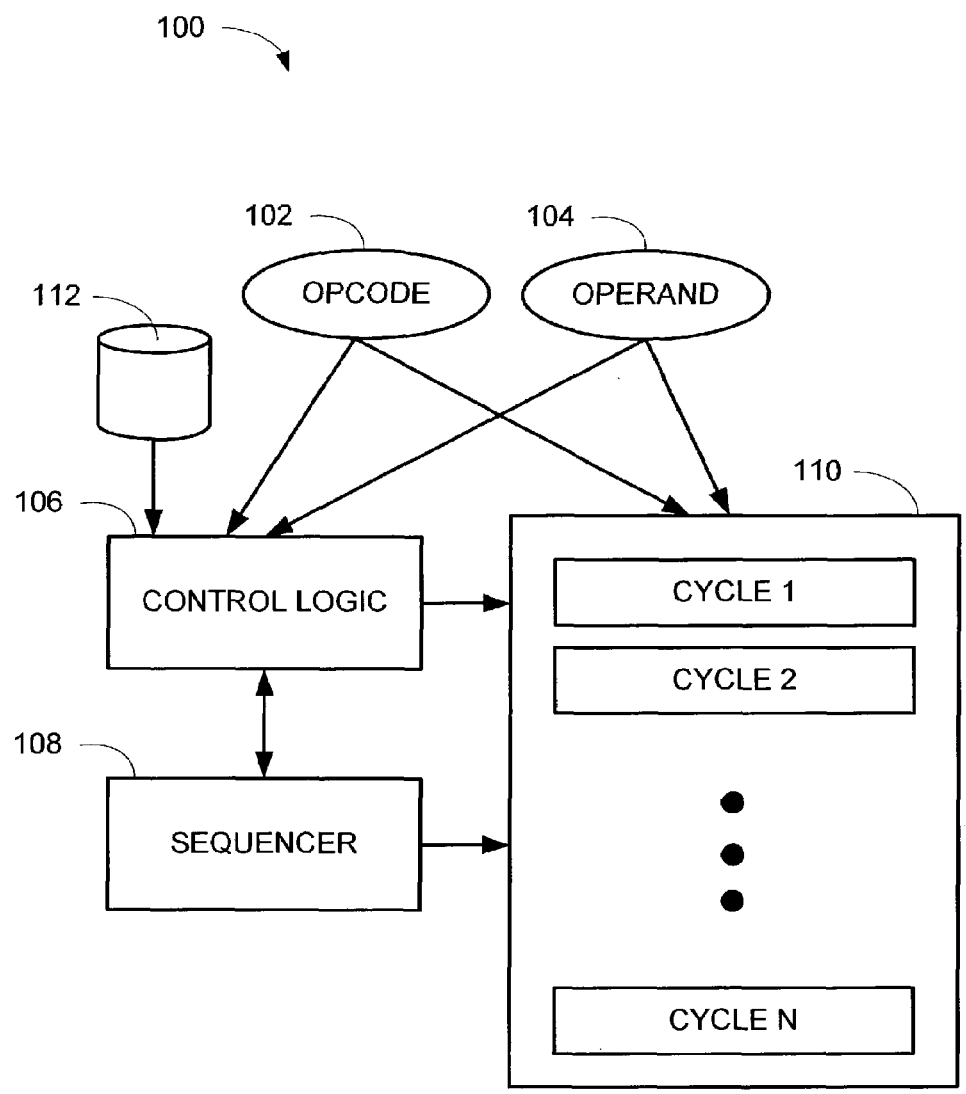
FIG. 1 is a block diagram illustrating a clock gating mechanism for a functional unit of a microprocessor.

Referring to FIG. 1 of the drawings, the reference numeral 100 generally designates a clock gating mechanism for a functional unit of a microprocessor. The clock gating mechanism 100 comprises an operational code 102, an operand 104, a control logic 106, a sequencer 108, a functional unit 110, and optionally a lookup table 112. The operational code 102 refers to an instruction to be executed in the function unit 110 and is also known as OPCODE. The operand 104 refers to a data input to be used in the execution of the operational code 102. The control logic 106 and the sequencer 108 are coupled to the functional unit 110. The control logic 106 and the sequencer 108 are shown to be coupled to each other. Alternatively, the control logic 106 and the sequencer 108 may be implemented in a single block (not shown).

The control logic 106 and the functional unit 110 are configured to receive the operational code 102 and the operand 104. The control logic 106 is configured to receive the operational code 102 and the operand 104 and to generate control signals (not shown) that control the clock gating of the functional unit 110. Note that an important example of the functional unit 110 is a floating-point unit (FPU).

In one embodiment of the present invention, the control signals are determined based on the operational code 102, the operand 104, and/or the execution cycle of the operational code 102. In another embodiment, the control logic 106 is coupled to the optional lookup table 112, which contains a set of predetermined control signals corresponding to combinations of the operational code 102 and the operand 104.

The functional unit 110 includes N cycles, each of which cycles has at least one latch (not show). The sequencer 108 is configured to detect which cycle among the N cycles the operand is currently in and to generate activation signals for latches (not shown). Preferably, the sequencer 108 is coupled to each cycle of the functional unit 110.

Now referring to FIGS. 2A–2D, shown is a block diagram illustrating an adder block 200 in different clock gating modes for saving power consumption. The adder block 200 is shown to describe part of a functional unit 110 of FIG. 1. Preferably, the adder block 200 is part of a floating-point unit (FPU) (not shown). As is well known in the art, an FPU consumes more power than any other type of functional unit. The adder block 200 comprises three parallel portions: an incrementer portion 202, a compound adder portion 204, and a sticky and select logic portion 206. The adder block 200 has two cycles. The first cycle is implemented by latches 208A, 208B, and 208C. The second cycle is implemented by latches 210A, 210B, and 210C. A first incrementer stage (INC) 212 of the incrementer portion 202 is coupled to and gated by the latch 208A. A second incrementer stage (INC)

214 of the incrementer portion 202 is coupled to and gated by the latch 210A. The latch 210A is also coupled to the first INC 212.

Similarly, a first compound adder stage (CADD) 216 of the compound adder portion 204 is coupled to and gated by the latch 208B. A second compound adder stage (CADD) 218 of the compound adder portion 204 is coupled to and gated by the latch 210B. The latch 210B is also coupled to the first CADD 216. A sticky logic 220 is coupled to and gated by the latch 208C. A select logic 222 is coupled to and gated by the latch 210C. The latch 210C is also coupled to the sticky logic 220.

FIGS. 2A–2D show different clock gating modes of the adder block 200 for different types of operations engaged in the adder block 200 and/or different values of operands used in the operations. For illustration purposes, the adder block 200 is used to calculate AB+C, where A, B, and C each are n-bit wide operands. In a single precision, for example, n is 24. In this instance, AB represents a product of A and B, whereas C represents an addend. Here, the product AB is 2 n bit wide. Note that only minimum details are shown for the adder block 200 for purposes of illustrating the present invention. Also note that a latch turned off is lightly shaded throughout FIGS. 2A–2D and 3A–3F.

Figure 2A:
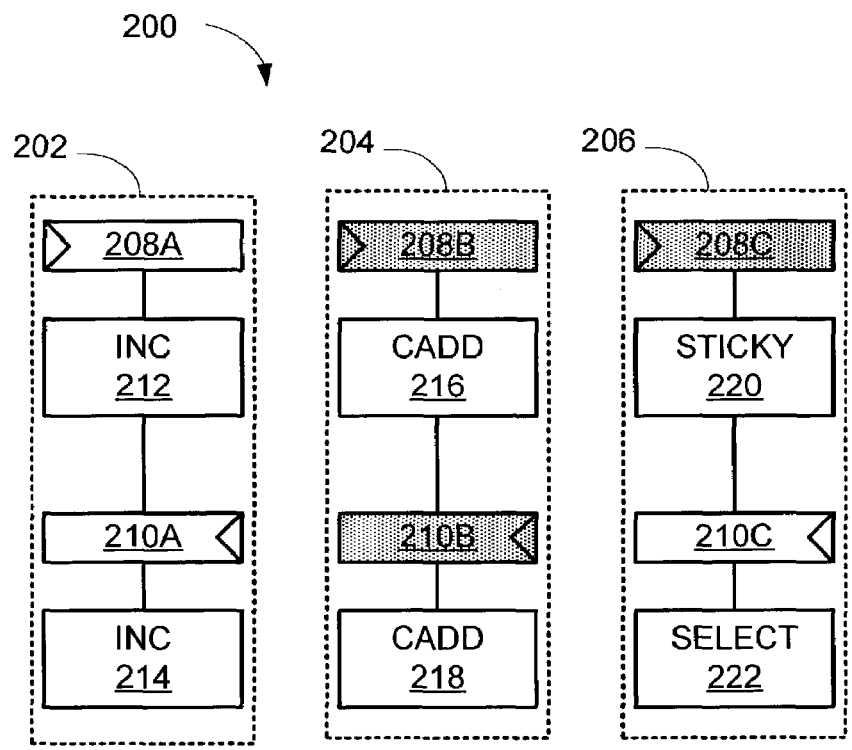
FIGS. 2A–2D each represent a block diagram illustrating different clock gating modes for saving power consumption in an adder block of a floating-point unit (FPU)

Specifically, FIG. 2A applies to any floating-point multiply-add type of operation, when the addend C is much larger than the product AB. Here, the addend C is considered much larger than the product AB if the least significant bit (LSB) of the addend C is x-bit higher in the order of magnitude in the binary scale than the most significant bit (MSB) of the product AB. Preferably, x is 2. In this case, the first CADD 216, the second CADD 218, and the sticky logic 220 can be shut down. This is done by gating off the latches 208B, 208C, and 210B, as shown in FIG. 2A.

Figure 2B:
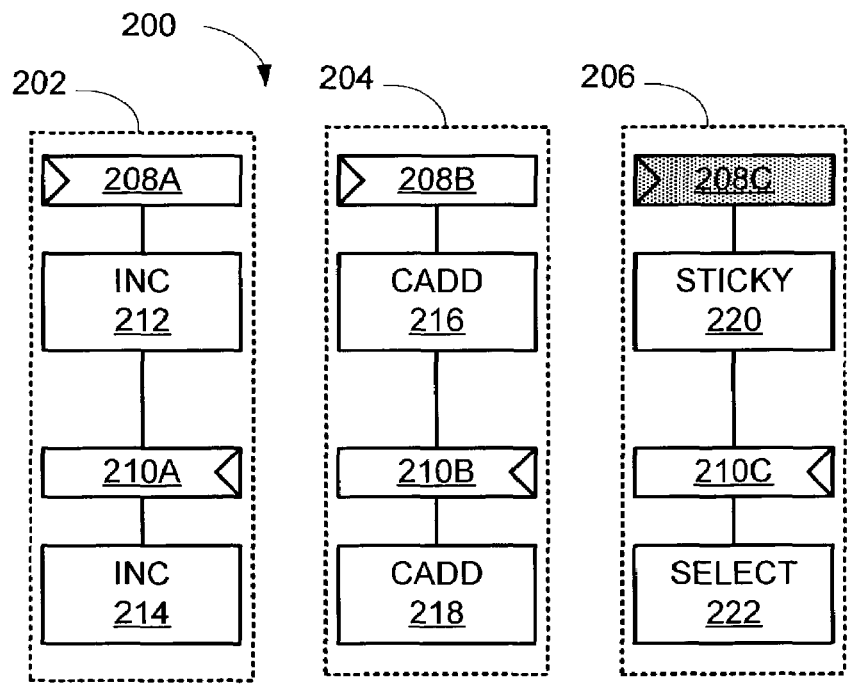

FIG. 2B applies to any floating-point multiply-add type of operation, when the addend C is larger than the product AB but the addend C and the product AB overlap. In this case, the sticky logic 220 can be shut down. This is done by gating off the latch 208C, as shown in FIG. 2B.

Figure 2C:
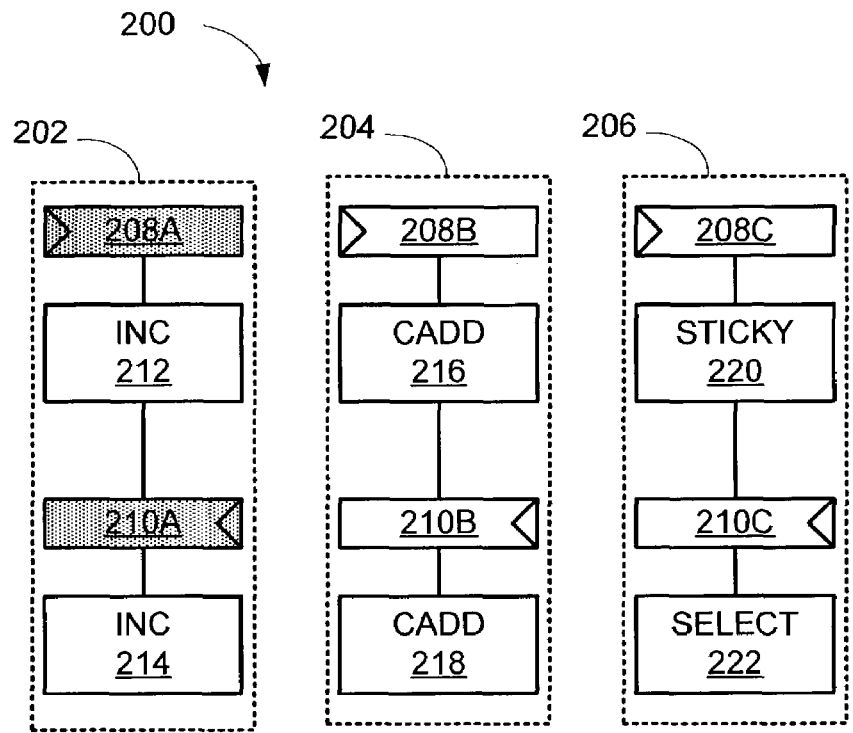

FIG. 2C applies to any floating-point multiply-add type of operation, when the addend C is no larger than the product AB. FIG. 2C also applies to conversions from floating-point to integer. Here, the addend C is considered no larger than the product AB if the most significant bit (MSB) of the addend C is not higher than the MSB of the product AB by any more than x bits. As before, x is preferably two. In this case, the first INC 212 and the second INC 214 can be shut down. This is done by gating off the latches 208A and 210A, as shown in FIG. 2C.

Figure 2D:
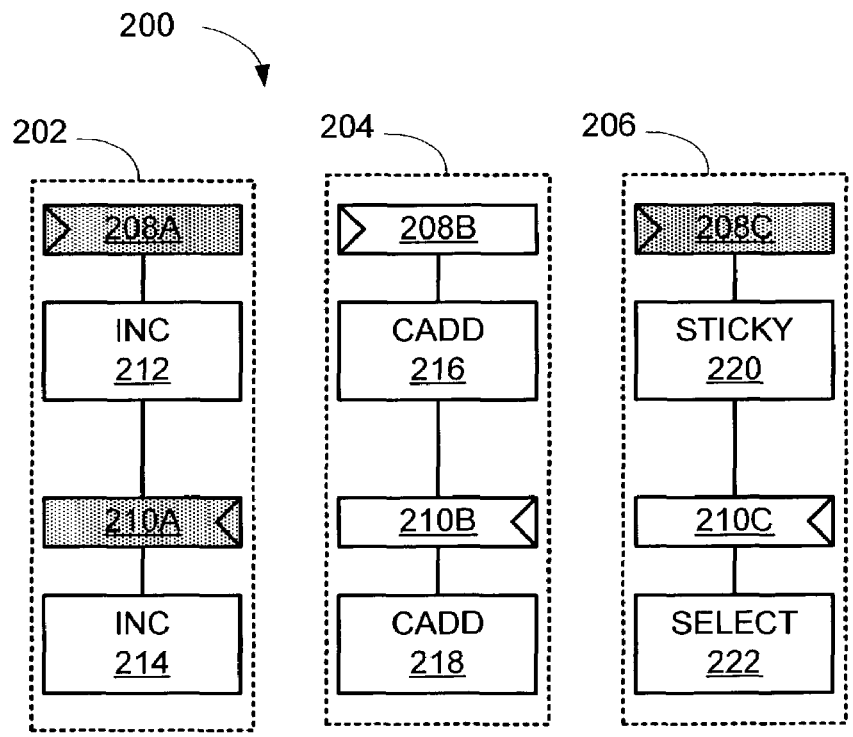

FIG. 2D applies to floating-point multiplications, integer multiplications and conversions from integer to floating-point. In this case, the first INC 212, the second INC 214, and the sticky logic 220 can be shut down. This is done by gating off the latches 208A, 210A, and 208C, as shown in FIG. 2D.

Now referring to FIGS. 3A–3F, shown is a block diagram illustrating a floating-point unit (FPU) pipeline 300 in different clock gating modes for saving power consumption. Note that the FPU pipeline 300 has ten cycles. The first cycle is implemented by an operational latch 302. The second cycle is implemented by latches 304A and 304B. The third cycle is implemented by latches 306A, 306B, 306C, 306D, and 306E. The fourth cycle is implemented by latches 308A, 308B, 308C, 308D, and 308E. The fifth cycle is implemented by latches 310A, 310B, 310C, and 310D. The sixth cycle is implemented by latches 312A, 312B, 312C, and 312D. The seventh cycle is implemented by latches 314A, 314B, 314C, and 314D. The eighth cycle is implemented by latches 316A, 316B, and 316C. The ninth cycle is implemented by latches 318A, 318B, and 318C. And the tenth cycle is implemented by latches 320A, 320B, and 320C.

In the first cycle, the operational latch 302 is coupled to and drives both a format block 322 and a special cases block 323. The latch 304A is coupled to drive a first EXP block 324. Similarly, the latch 306A is coupled to drive a second EXP block 326; the latch 308A is coupled to drive a third EXP block 328; the latch 310A is coupled to drive a fourth EXP block 330; the latch 312A is coupled to drive a fifth EXP block 332; the latch 314A is coupled to drive a sixth EXP block 334; the latch 316A is coupled to drive a seventh EXP block 336; and the latch 318A is coupled to drive an eighth EXP block 338.

The latch 304A is also coupled to drive a first ALIGN block 340; the latch 306B is coupled to drive a second ALIGN block 342; and the latch 308B is coupled to drive a third ALIGN block 344. The latch 304A is also coupled to drive a first BYPASS block 346. The latch 304A is finally coupled to drive a first MUL block 348; the latch 306D is coupled to drive a second MUL block 350; and the latch 308D is coupled to drive a third MUL block 352. The latch 304B is coupled to drive a SPEC. block 354. The latch 314D is coupled to drive a second BYPASS block 356.

The latches 310B and 310C are coupled to drive a first LZA block 358. The latch 312B is coupled to drive a second LZA block 360. The latches 310B and 310C are also coupled to drive a first ADD block 362. The latch 312C is coupled to drive a second ADD block 364. The latches 314B and 314C are coupled to drive a NORMALIZE block 366. The latch 316B is coupled to a first ROUND block 368. The latch 318B is coupled to a second ROUND block 370. The latches 320A, 320B, and 320C are coupled to drive a RESULT SELECT block 372.

Figure 3A:
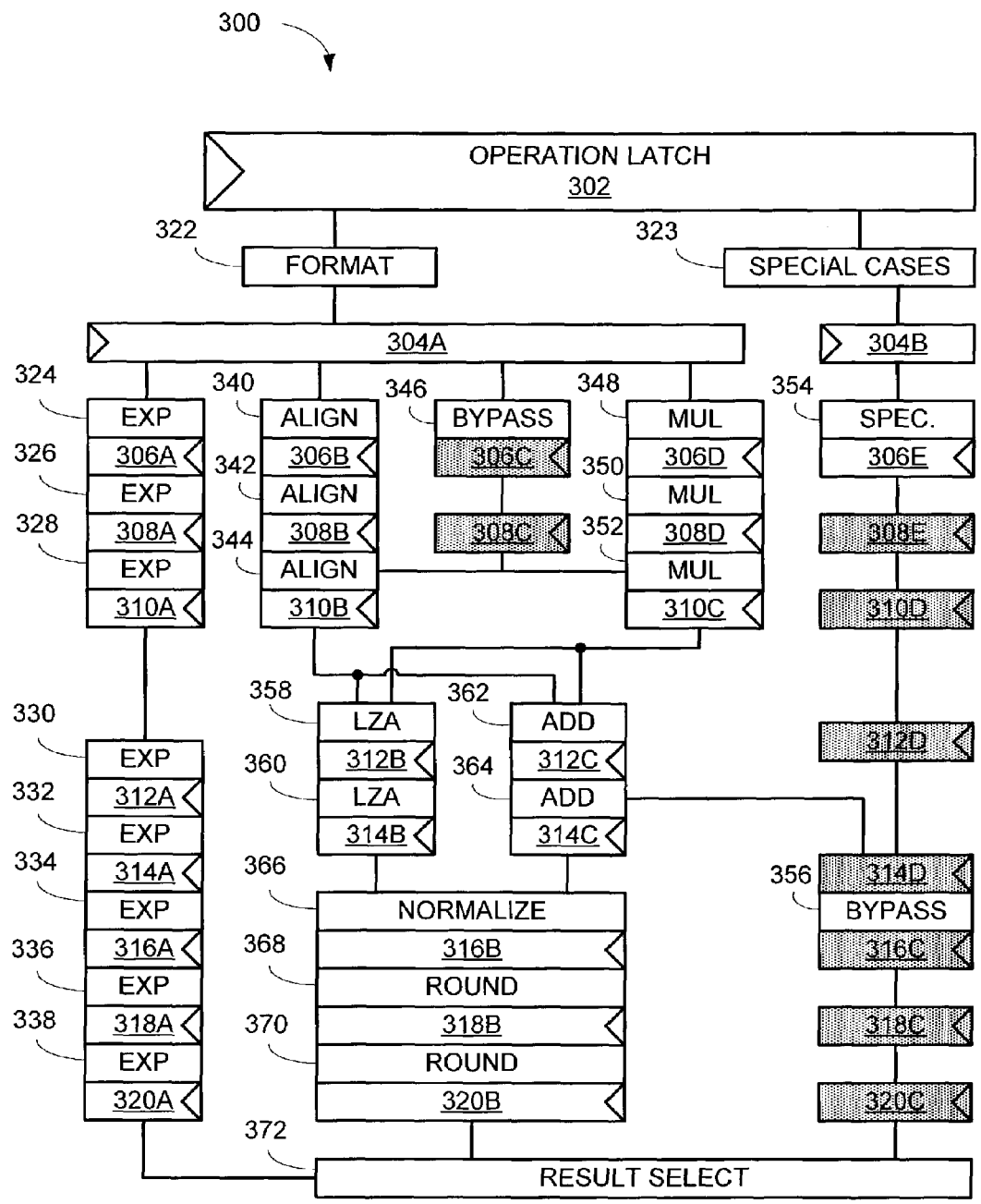
FIGS. 3A–3F each represent a block diagram illustrating different clock gating modes for saving power consumption in a floating-point unit (FPU) pipeline.

FIG. 3A illustrates a gating mode on a floating-point multiply-add operation with standard operands and results with no special values. In this case, most of the blocks are needed; but two bypass paths including the first BYPASS block 346 and the second BYPASS block 356 can be shut down. Hence, the latches 306C, 308C, 308E, 310D, 312D, 314D, 316C, 318C, and 320C can be turned off, as shown in FIG. 3A.

Figure 3B:
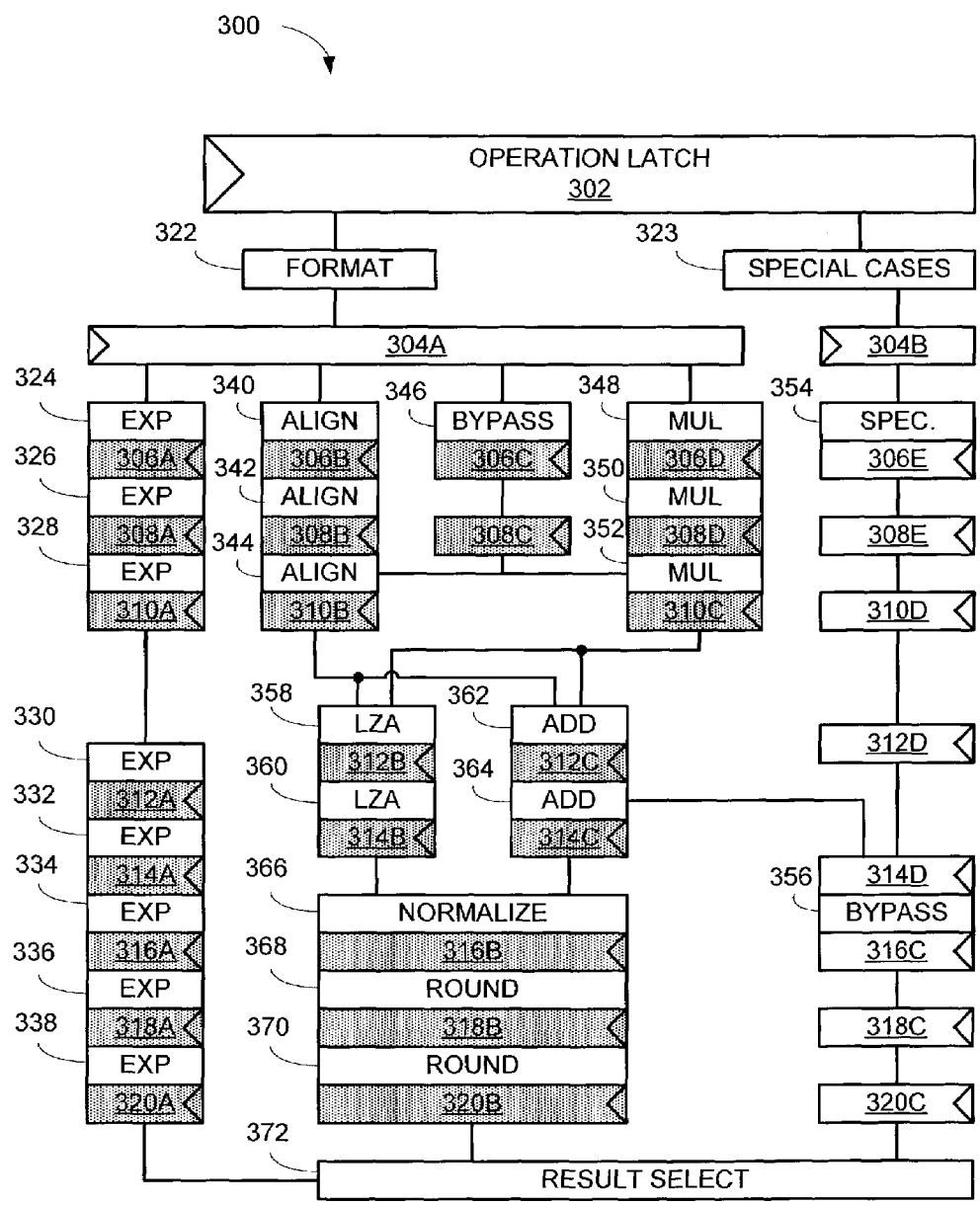

FIG. 3B illustrates any floating-point operations with special inputs and/or results. In this case, only the special case logic is needed. Except for that logic and the corresponding bypass, the rest logic blocks of the FPU can be shut down. Hence, the latches 306A–306D, 308A–308D, 310A–310C, 312A–312C, 314A–314C, 316A, 316B, 318A, 318B, 320A, and 320B can be turned off, as shown in FIG. 3B.

Figure 3C:
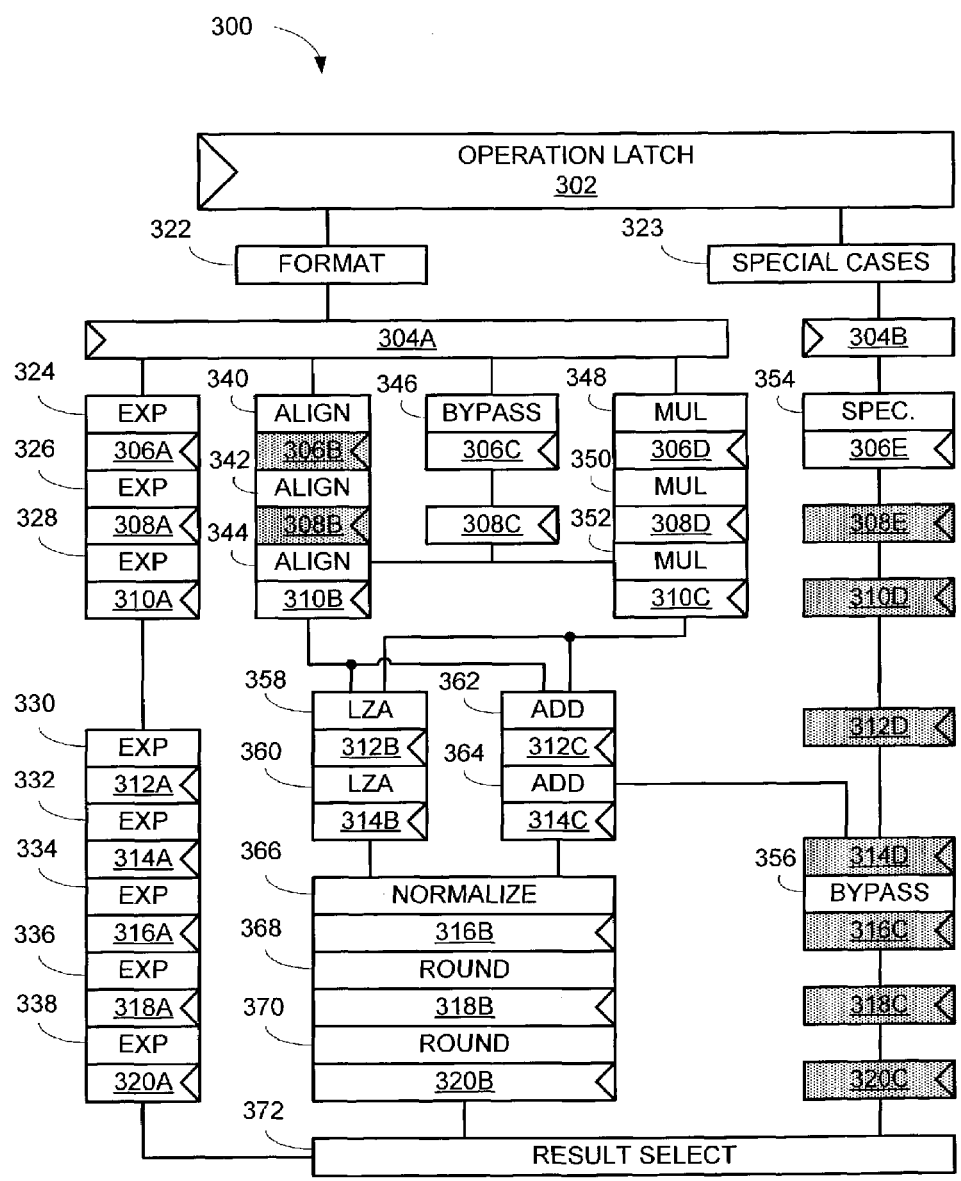

FIG. 3C illustrates a floating-point multiply operation with standard operands and results. In this case, the aligner and the bypassing of the special case values can be shut down. Hence, the latches 306B, 308B, 308E, 310D, 312D, 314D, 316C, 318C, and 320C can be turned off, as shown in FIG. 3C.

Figure 3D:
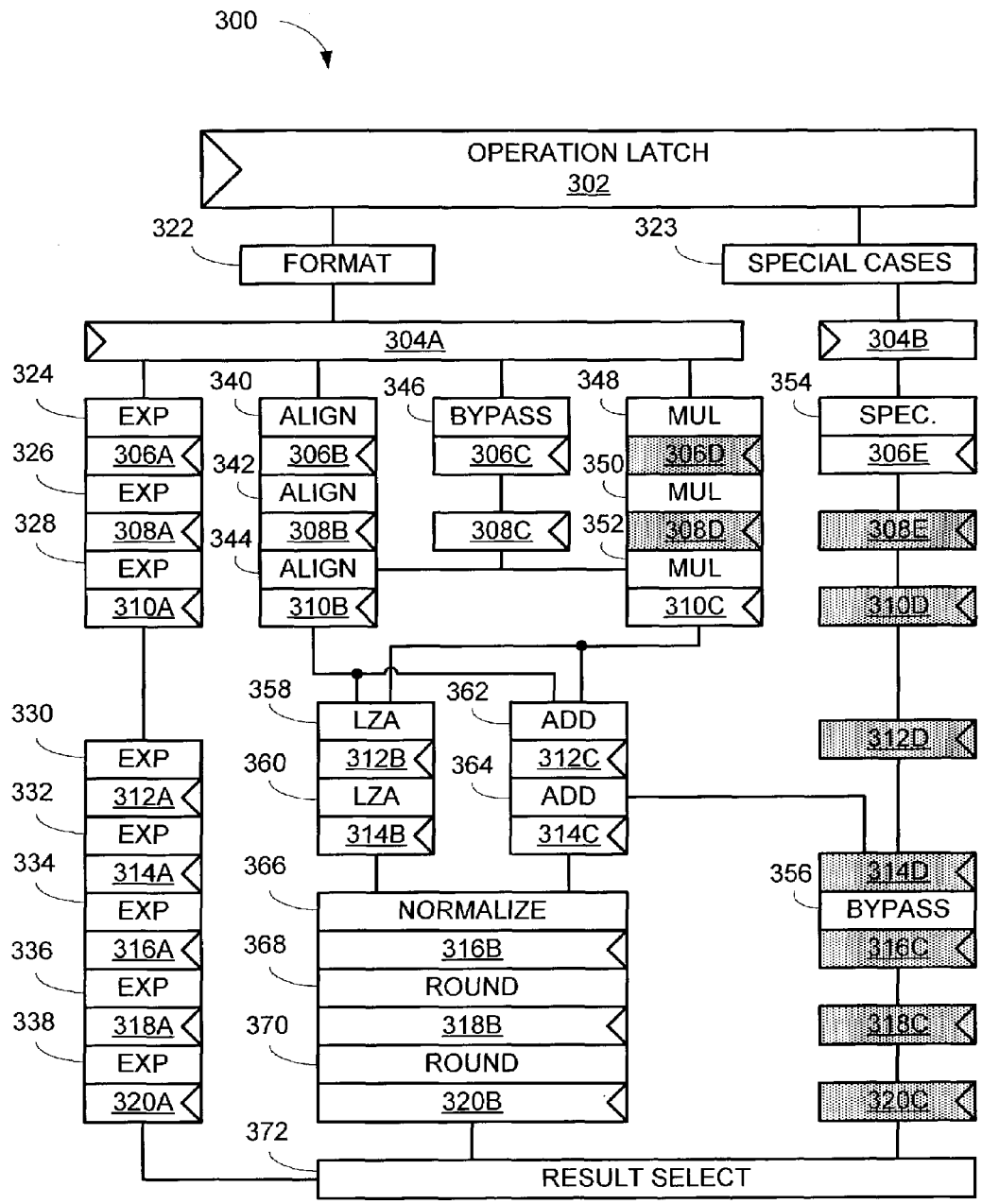

FIG. 3D illustrates a floating-point operation of addition, subtraction, or conversion to integer with standard operands. In this case, the multiplier and the bypassing of the special case values can be shut down. Hence, the latches 306D, 308D, 308E, 310D, 312D, 314D, 316C, 318C, and 320C can be turned off, as shown in FIG. 3D.

Figure 3E:
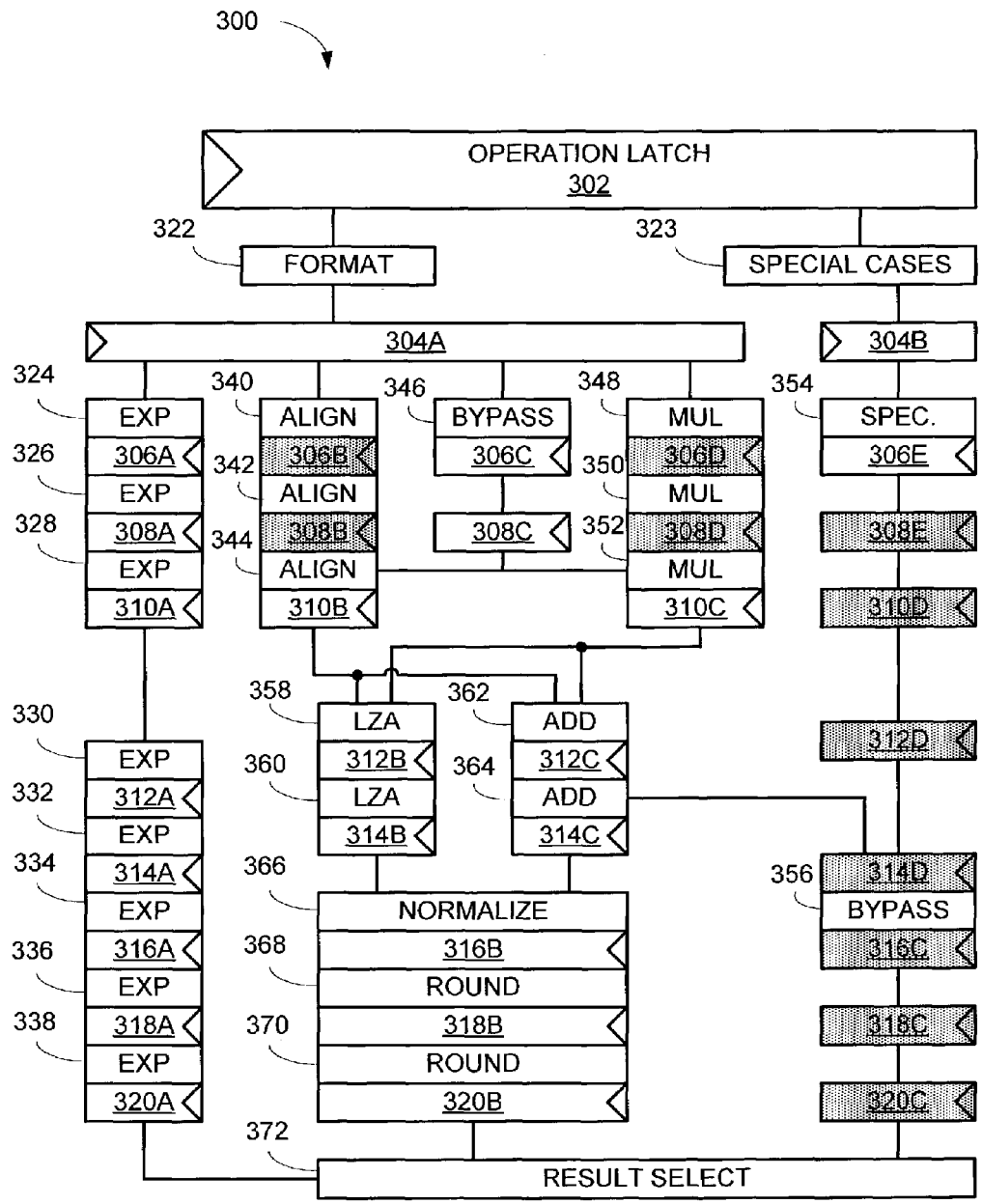

FIG. 3E illustrates a conversion operation from integer to floating-point for standard inputs. In this case, multiplier, aligner, and bypassing of the special case values can be shut down. Hence, the latches 306B, 306D, 308B, 308D, 308E, 310D, 312D, 314D, 316C, 318C, and 320C can be turned off, as shown in FIG. 3E.

Figure 3F:
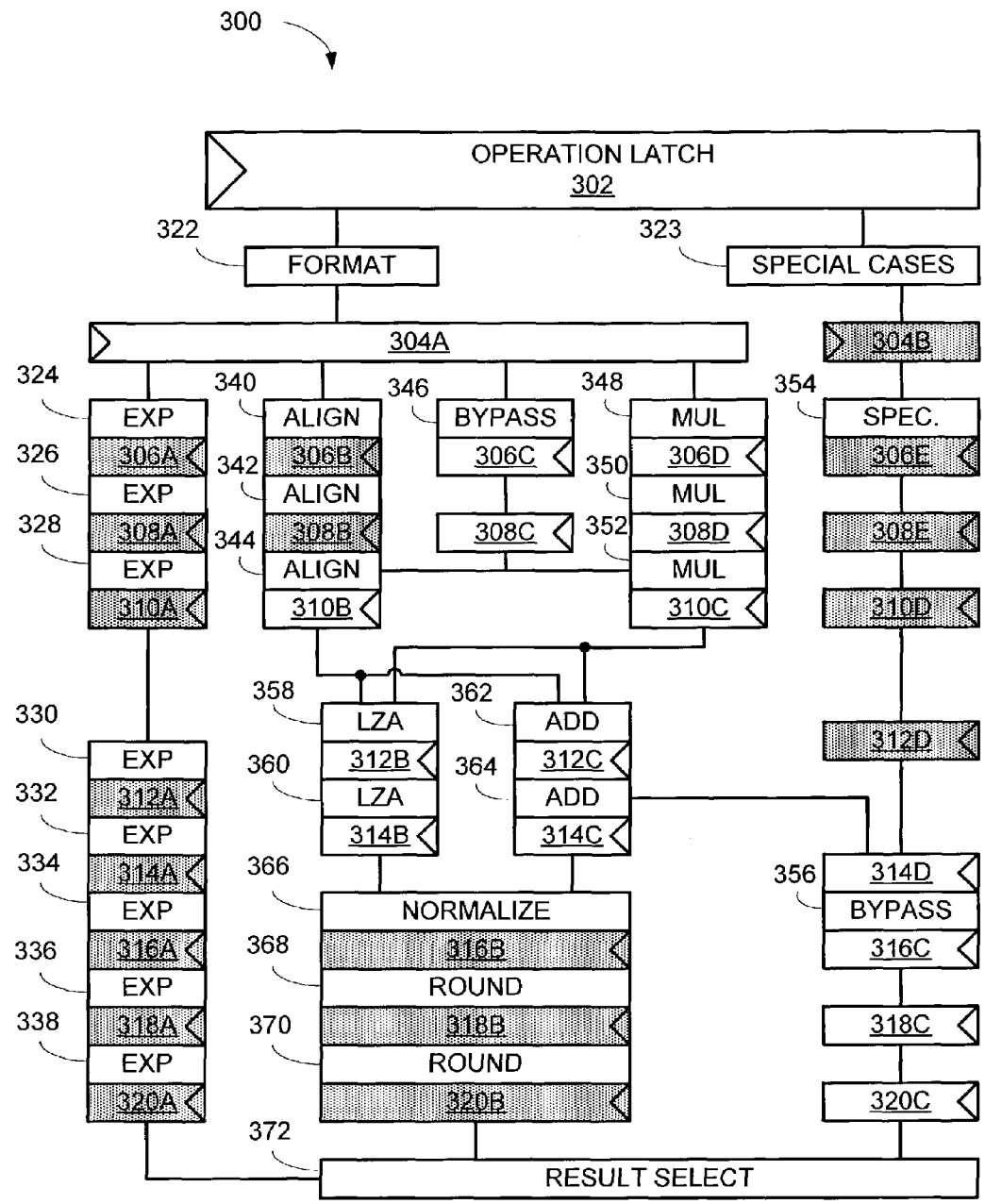

FIG. 3F illustrates integer multiply and multiply-add operations. In this case, aligner, exponent path, rounder, and the upper part of the special case bypass logic can be shut down. Hence, the latches 304B, 306A, 306B, 306E, 308A, 308B, 308E, 310A, 310D, 312A, 312D, 314A, 316A, 316B, 318A, 318B, 320A, and 320B can be turned off, as shown in FIG. 3F.

Figure 4:
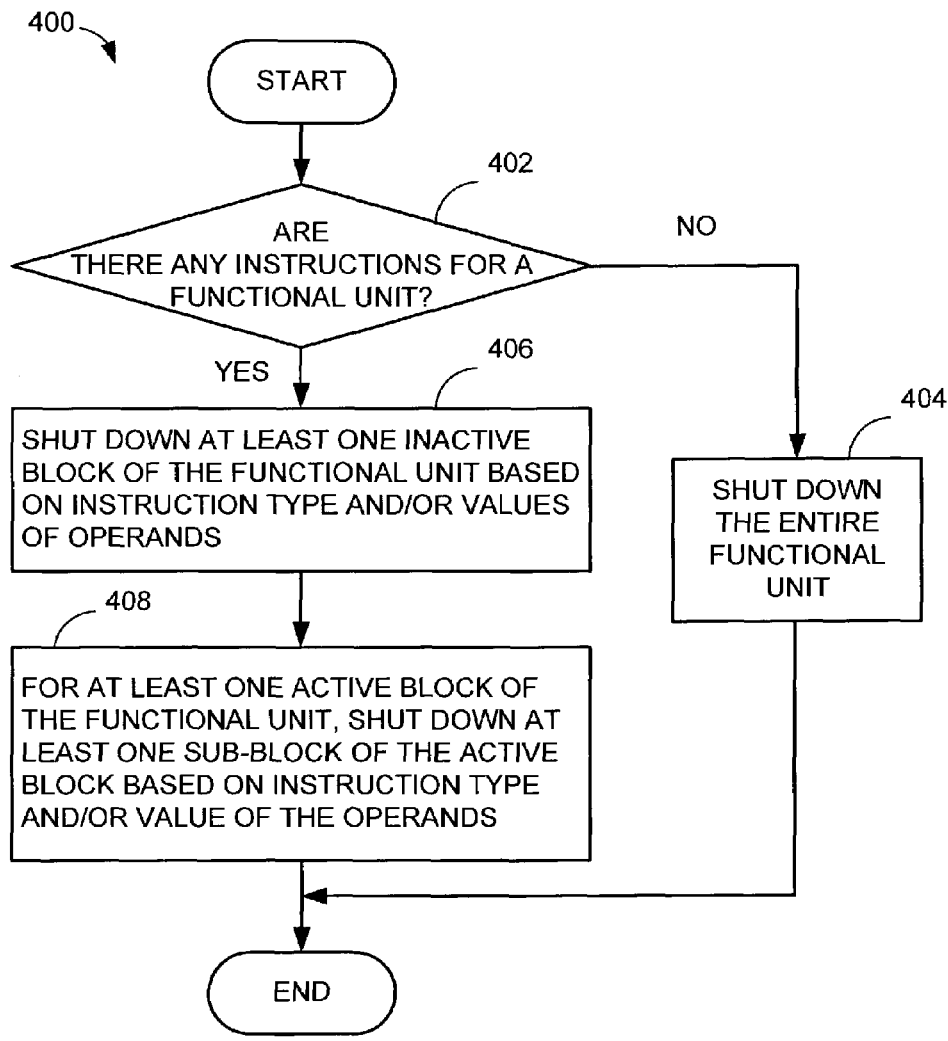
FIG. 4 is a flow diagram illustrating a multilevel clock gating scheme.

Now referring to FIG. 4, a flow diagram illustrates a multilevel clock gating scheme 400. In step 402, it is determined whether there is any instruction for a functional unit. Preferably, the functional unit is a floating-point unit (FPU). Upon a determination that there is no instruction for the functional unit, in step 404, the entire functional unit is shut down. Upon a determination that there is at least one instruction for the functional unit, in step 406, at least one inactive block of the functional unit is shut down based on instruction type and/or values of operands. Preferably, the execution cycle of the instruction may also be considered in addition to the instruction type and/or values of operands.

In step 408, for at least one active block of the functional unit, at least one sub-block of the active block is shut down based on instruction type and/or value of the operands. For example, at least one active block is an adder block as shown in FIGS. 2A–2D.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for saving power in a microprocessor having at least one functional unit having a plurality of blocks each including a plurality of sub-blocks, the method comprising the steps of:
    determining whether there is any instruction for the at least one functional unit;
    upon a determination that there is no instruction for the at least one functional unit, shutting down the at least one functional unit;
    upon a determination that there is at least one instruction for the at least one functional unit, wherein the at least one functional unit has at least one inactive block and at least one active block, shutting down the at least one inactive block based on the at least one instruction; and
    for the at least one active block, wherein the at least one active block has at least one inactive sub-block, shutting down the at least one inactive sub-block based on the at least one instruction.

2. The method of claim 1, wherein the at least one inactive sub-block is shut down based on both the at least one instruction and one or more operands used to execute the at least one instruction.

3. The method of claim 1, wherein the functional unit is a floating-point unit (FPU).

4. The method of claim 3, wherein the at least one active block is an adder block.

5. An apparatus for saving power in a microprocessor having at least one functional unit having a plurality of blocks each including a plurality of sub-blocks, the apparatus comprising:
    means for determining whether there is any instruction for the at least one functional unit;
    means for, upon a determination that there is no instruction for the at least one functional unit, shutting down the at least one functional unit;
    means for, upon a determination that there is at least one instruction for the at least one functional unit, wherein the at least one functional unit has at least one inactive block and at least one active block, shutting down the at least one inactive block based on the at least one instruction; and
    for the at least one active block, wherein the at least one active block has at least one inactive sub-block, shutting down the at least one inactive sub-block based on the at least one instruction.

6. The apparatus of claim 5, wherein the at least one inactive sub-block is shut down based on both the at least one instruction and one or more operands used to execute the at least one instruction.

7. The apparatus of claim 5, wherein the functional unit is a floating-point unit (FPU).

8. The apparatus of claim 7, wherein the at least one active block is an adder block.

9. A computer program product for saving power in a microprocessor having at least one functional unit having a plurality of blocks each including a plurality of sub-blocks, the computer program product having a computer readable medium with a computer program embodied thereon, the computer program comprising:
    computer program code for determining whether there is any instruction for the at least one functional unit;
    computer program code for, upon a determination that there is no instruction for the at least one functional unit, shutting down the at least one functional unit;
    computer program code for, upon a determination that there is at least one instruction for the at least one functional unit, wherein the at least one functional unit has at least one inactive block and at least one active block, shutting down the at least one inactive block based on the at least one instruction; and
    computer program code for, for the at least one active block, wherein the at least one active block has at least one inactive sub-block, shutting down the at least one inactive sub-block based on the at least one instruction.

10. The computer program product of claim 9, wherein the at least one inactive sub-block is shut down based on both the at least one instruction and one or more operands used to execute the at least one instruction.

11. The computer program product of claim 9, wherein the functional unit is a floating-point unit (FPU).

12. The computer program product of claim 11, wherein the at least one active block is an adder block.

* * * * *